US011431946B2

(12) United States Patent
Arai (10) Patent No.: US 11,431,946 B2
(45) Date of Patent: Aug. 30, 2022

(54) SIGNAL DETECTION DEVICE, SIGNAL DETECTION METHOD, AND STORAGE MEDIUM (71) Applicant: CASIO COMPUTER CO., LTD., Tokyo (JP)

(72) Inventor: Toshiharu Arai, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 247 days.

(21) Appl. No.: 16/715,125

(22) Filed: Dec. 16, 2019

(65) Prior Publication Data

US 2020/0195899 A1 Jun. 18, 2020

(30) Foreign Application Priority Data

Dec. 17, 2018 (JP) .............................. JP2018-235055

(51) Int. Cl.
*H04N 9/31* (2006.01)
*H04N 5/46* (2006.01)
*G03B 21/20* (2006.01)
(52) U.S. Cl.
CPC ......... *H04N 9/3155* (2013.01); *G03B 21/206* (2013.01); *H04N 9/3176* (2013.01); *H04N 9/3179* (2013.01)

(58) Field of Classification Search
CPC .. H04N 9/3179; H04N 9/3191; H04N 9/3155; H04N 9/3141; H04N 5/46; G03B 21/206
See application file for complete search history.

(56) References Cited

U.S. PATENT DOCUMENTS

2011/0211405 A1* 9/2011 Ko ........................... G11C 7/22
365/194

FOREIGN PATENT DOCUMENTS

JP 2006-023551 A 1/2006

* cited by examiner

*Primary Examiner* — Ryan D Howard
(74) *Attorney, Agent, or Firm* — Fitch, Even, Tabin & Flannery LLP (57) ABSTRACT

A signal detection device of the present invention includes a first control unit configured to determine whether there are inputs of a plurality of external signals connected thereto, a second control unit configured to be activated after the first control unit is activated, a first input unit connected directly to the first control unit and configured to input a first external signal, which is one type of the plurality of external signals, and a second input unit connected to the first control unit via the second control unit and configured to input a second external signal, which is another type of the plurality of external signals, and the first control unit determines whether there is an input of the first external signal before the second control unit is activated and determines whether there is an input of the second external signal after the second control unit is activated.

20 Claims, 3 Drawing Sheets

FIG.1

SIGNAL DETECTION DEVICE, SIGNAL DETECTION METHOD, AND STORAGE MEDIUM

CROSS-REFERENCE TO RELATED APPLICATION

This patent application is based upon and claims the benefit of priority under 35 USC 119 of Japanese Patent Application No. 2018-235055 filed on Dec. 17, 2018, the entire disclosure of which, including the description, claims, drawings, and abstract, is incorporated herein by reference in its entirety.

BACKGROUND OF THE INVENTION

Field of the Invention

The present invention relates to a signal detection device, a signal detection method, and a storage medium.

Description of the Related Art

Conventionally, there have been disclosed projectors including a plurality of signal input terminals and configured to capture an image signal from the signal input terminal into which the image signal is inputted. For example, an image projecting projector described in Japanese Patent Laid-Open No. 2006-23551 has a usage frequency table by input terminal in which the past number of times of signal input by time band is stored for each image signal input terminal, and whether an image signal has been inputted is detected for each image signal input terminal in the descending order of usage frequency in a specific time band.

In the device for detecting the image signal input in the way described above, there may be a situation where a signal detection control unit for detecting an external input signal is provided separately from a main control unit of the device. Then, when the device is activated, there may be a situation where the activation of the main control unit differs in timing from the activation of the signal detection control unit, and as a result, it is considered that the difference in activating timing may cause the main control unit to perform a useless operation such as enquiring of the signal detection control unit about whether there has been an input of a signal before it is activated.

SUMMARY OF THE INVENTION

An object of the present invention is to provide a signal detection device for detecting an external input signal with good efficiency, a signal detection method, and a storage medium.

According to an aspect of the present invention, there is provided a signal detection device including a first control unit configured to determine whether there are inputs of a plurality of external signals connected thereto, a second control unit configured to be activated after the first control unit is activated, a first input unit connected directly to the first control unit and configured to input a first external signal, which is one type of the plurality of external signals, and a second input unit connected to the first control unit via the second control unit and configured to input a second external signal, which is another type of the plurality of external signals, and in the signal detection device, the first control unit determines whether there is an input of the first external signal before the second control unit is activated and determines whether there is an input of the second external signal after the second control unit is activated.

According to another aspect of the present invention, there is provided a signal detection method for a device including a first control unit configured to determine whether there are inputs of a plurality of external signals connected thereto, a second control unit configured to be activated after the first control unit is activated, a first input unit connected directly to the first control unit and configured to input a first external signal, which is one type of the plurality of external signals, and a second input unit connected to the first control unit via the second control unit and configured to input a second external signal, which is another type of the plurality of external signals, and in this signal detection method, the first control unit determines whether there is an input of the first external signal after the first control unit is activated and determines whether there is an input of the second external signal after the second control unit is activated.

According to a further aspect of the invention, there is provided a storage medium configured to be read by a computer including a first control unit configured to determine whether there are inputs of a plurality of external signals connected thereto, a second control unit configured to be activated after the first control unit is activated, a first input unit connected directly to the first control unit and configured to input a first external signal, which is one type of the plurality of external signals, and a second input unit connected to the first control unit via the second control unit and configured to input a second external signal, which is another type of the plurality of external signals, and the computer is caused to determine whether there is an input of the first external signal after the first control unit is activated and determine whether there is an input of the second external signal after the second control unit is activated.

DETAILED DESCRIPTION OF THE PREFERRED EMBODIMENT

Figure 1:
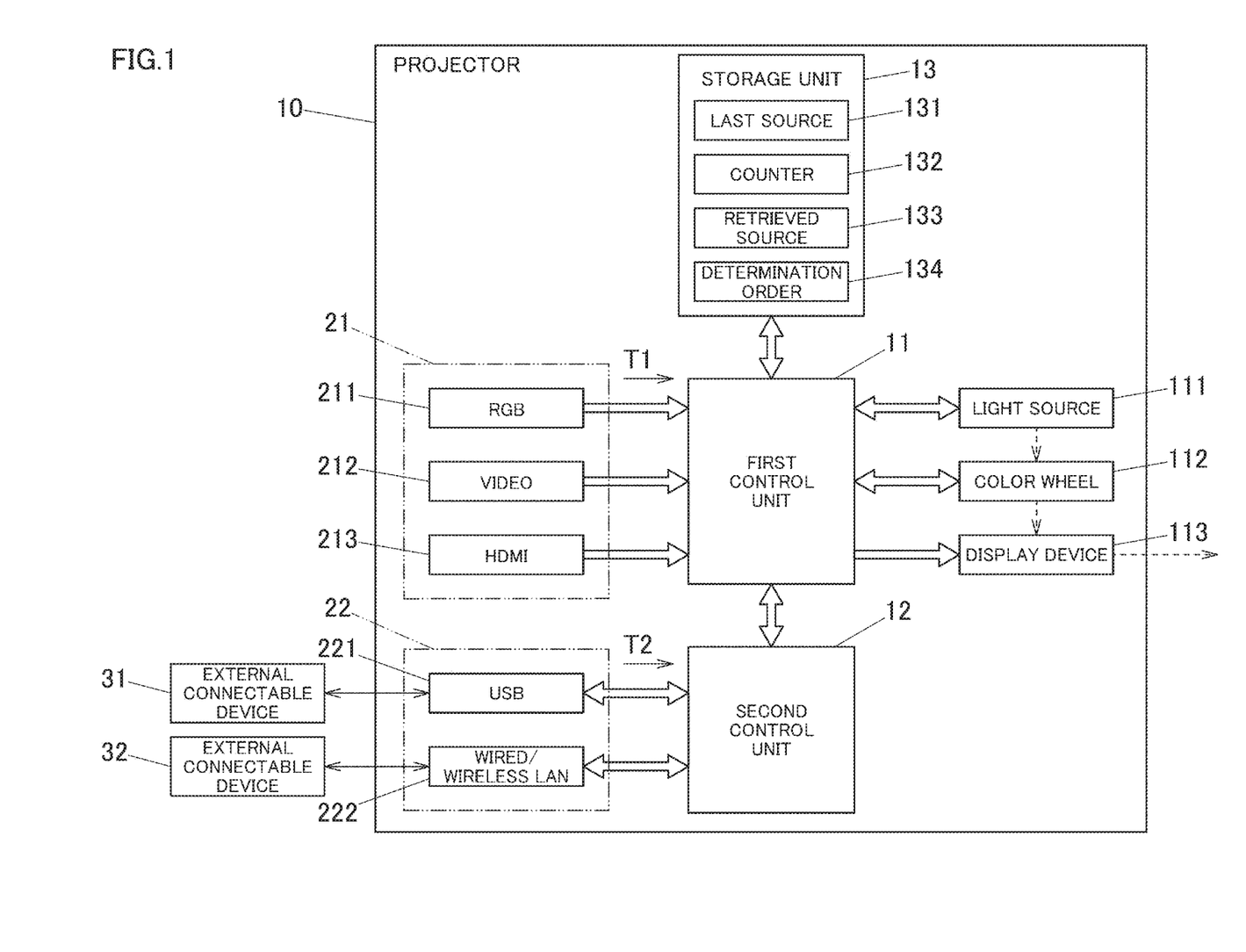
FIG. 1 is a block diagram of a projector according to an embodiment of the present invention.

Hereinafter, a mode for carrying out the present invention will be described based on an embodiment thereof. FIG. 1 is a block diagram showing the configuration of a projector 10 according to the embodiment. The projector 10 is a digital light processing or DLP (a registered trade mark) projector for projecting an image on to a screen, a wall, or the like. The projector 10 is connected to external connectable devices 31, 32 with wires or wirelessly and outputs to project images from these external connectable devices 31, 32.

The projector 10 includes a first control unit 11 (a first control means), which constitutes a main CPU, a second control unit 12 (a second control means), which constitutes a multimedia CPU configured to control mainly the input and output of an external input signal, and a storage unit 13. In addition, the projector 10 includes further a first input unit 21 (a first input means) and a second input unit 22 (a second input means), the first and second input units each constituting an interface through which an external input signal is inputted, a light source 111 configured to generate a projected image, a color wheel 112, and a display device 113. The external signal includes an image and video data.

The first control unit 11 receives an external signal T1 (a first external signal) directly from the first input unit 21. The second control unit 12 receives an external signal T2 (a second external signal) from the second input unit 22 and transmits it to the first control unit 11. The first control unit 11 can image process the external signal T1, which the first control unit 11 receives directly, and the external signal T2, which the first control unit 11 receives by way of the second control unit 12, and project the image processed external signals to an exterior of the projector 10 as image light by controlling the light source 111, the color wheel 112, and the display device 113.

The light source 111 emits light having a wavelength in the blue wavelength range, light having a wavelength in the green wavelength range, and light having a wavelength in the red wavelength range towards the display device 113 within a single time-shared image frame. The blue light, green light and red light, which are emitted from the light source 111, can be dimmed by removing unnecessary wavelength components as required by the color wheel 12 before they are shined on to the display device 113. The projector 10 of this embodiment is the DPL projector, and digital micromirror devices (DMDs) are used for the display device 113. The first control unit 11 can cause the display device 113 to reflect the lights emitted from the light source 111 to thereby form image light. The image light reflected by the display device 113 is then projected on to a screen or the like, which is provided outside the projector 10, by way of lenses, not shown, within the projector 10.

The storage unit 13 stores a last source 131, a counter 132, a retrieved source 133, and a determination order 134. The last source 131 stores either the first input unit 21 or the second input unit 22 as a source constituting an output origin of image data that is last projected. The counter 132 counts the number of times of determination on whether there have been inputs of external signals T1, T2 for use in determining whether the determination process is to be ended. The retrieved source 133 stores one in RGB 211 (VGA), Video 212, and HDMI (a registered trade mark) 213 which constitute together the first input unit 21, the one constituting a source on which a determination on whether there has been an input of an external signal is last made. The determination order 134 stores a determination order in which a determination on whether there has been an input of an external signal is made in the first input unit 21 and a determination order in which a determination on whether there has been an input of an external signal is made in the second control unit 22. Additionally, the storage unit 13 can store a setting of effecting or nullifying an automatic detection of external signals T1, T2 (an automatic input search), various programs for controlling the projector 10, data of projected images, and the like. The storage unit 13 stores a signal detection program configured to cause the projector 10, which is a computer, to make a determination on whether there has been an input of an external signal T1 after the first control means (the first control unit 11) is activated and before the second control means (the second control unit 12) is activated and cause the projector 10 to make a determination on whether there has been an input of an external signal T2 once the activation of the second control means (the second control unit 12) is detected. A specific process will be described later by reference to FIGS. 2 and 3.

The first input unit 21 includes RGB 11, Video 212, and HDMI 213. The second input unit 22 includes USB 221 and a wired/wireless LAN 222. An electronic dictionary or an electronic calculator can be connected to USB 221 as an external connectable device 31. A personal computer, a tablet PC, a smartphone, or the like can be connected to the wired/wireless LAN 222 as an external connectable device 32. A plurality of external connectable devices 32 may concurrently be connected to the wired/wireless LAN 222, and the plurality of external connectable devices 32 may be prioritized.

Next, referring to FIG. 2, a flowchart (1) of processes that the first control unit 11 performs when the projector 10 is activated will be described. Firstly, when a power supply is connected to input electric power into the projector 10, the first control unit 11 executes an initialization in step S101. As the initialization, for example, the control unit 11 resets the counter 132 used in steps S112 and S209, which will be described later.

In step S102, the control unit 11 determines whether the setting of the automatic input search, which has already been set in the storage unit 13, is effective or nullified. If it determines that the automatic input search is not effective (No in step S102), the first control unit 11 refers to the storage unit 13 to verify the last source 131 (S104). In this embodiment, any one of RGB 211, Video 212, HDMI 213, USB 221 and the wired/wireless LAN 222 is stored as the last source 131.

In step S105, the control unit 11 executes a switching to the external input that is stored as the last source 131 and ends the process. For example, in the case where the last source 131 is HDMI 213, the control unit 11 switches the external input to HDMI 213, generates an image by controlling the light source 111, the color wheel 112 and the display device 113, and causes the image so generated to be projected to an exterior of the projector 10. In the case where no external signal is inputted into HDMI 213, the first control unit 11 can cause a blue image or a black image to be projected as a projected image.

If the setting of the automatic input search is effective (Yes in step S102), the first control unit refers to the storage unit 13 to obtain the last source 131 in step S103. For example, the first control unit 11 can obtain HDMI 213 as the last source 131.

Next, in steps S106, S108, and S010 below, the first control unit 11 determines sequentially whether there is an input of an external signal from the first input unit 21. As to a order in which the determination is made, in the case where the last source 131 obtained in step S103 is either USB 221 or the wired/wireless LAN 222 that is included in the second input unit 22, the first control unit 11 determines whether there is an input from the first input unit 21 by following the predetermined determination order 134 insteps S106, S108, and S110. In this embodiment, since the order of RGB 211, Video 212, and HDMI 213 is stored in advance in the storage unit 13 as the determination order 134 in the first input unit 21, with the last source 131 being the second input unit 22, the first control unit 11 determines whether there is an input of an external signal T1 in the order of RGB 211, Video 212, and HDMI 213 that differs from the one shown in FIG. 2 in each of steps S106, S108, and S110.

On the other hand, in the case where the last source 131 that is obtained in step S103 is any one of RGB 211, Video 212 and HDMI 213 that are included in the first input unit 21, the control unit 11 firstly determines whether there is an input of an external signal T1 from the last source 131, and thereafter, the first control unit 11 continues to determine whether there is an input of an external signal T1 by following the determination order 134. In this embodiment, since the last source 131 that is obtained in step S103 is HDMI 213, and the determination order 134 in the first input unit 21 is RGB 211, Video 212, and HDMI 213, the first control unit 11 determines whether there is an input of an external signal T1 in the order of HDMI 213, RGB 211, and Video 212 in each of steps S106, S108 and S110. Hereinafter, processes from step S106 on will be described.

In step S106, the first control unit 11 determines whether there is an input of an external signal T1 from HDMI 213 (the last source 131) of the first input unit 21. If it determines that there is an input of an external terminal T1 from HDMI 213 (Yes in step S106), the first control unit 11 switches the source to the external signal T1 from HDMI 213 for projection (S113) and ends the process. If it determines that there is no input of an external signal T1 from HDMI 213 (No in step S106), the first control unit 11 proceeds to a process in step S107.

In step S107, the first control unit 11 determines whether the second control unit 12 is activated. The first control unit 11 enquires on the second control unit 12 about whether the second control unit 12 is activated, and if there is not response from the second control unit 12, the first control unit 11 can determine that the second control unit 12 is not activated. Alternatively, the first control unit 11 can determine that the second control unit 12 is activated when a predetermined signal is inputted into the first control unit 11 from the second control unit 12. The first control unit 11 sets HDMI 213 as the retrieved source 133 (S114) when the second control unit 12 is activated (Yes in S107) and proceeds to step S201 shown in FIG. 3. On the other hand, the first control unit 11 proceeds to a process in step S108 when the second control unit 12 is not activated (No in S107).

In step S108, the first control unit 11 determines whether there is an input of an external signal T1 from the RGB 211 of the first input unit 21. If it determines that there is an input of an external signal T1 from RGB 211 (Yes in S108), the first control unit 11 switches the source to the external signal T1 from RGB 211 for projection (S115) and ends the process. If it determines that there is no input of an external signal T1 from RGB 211 (No in S108), the first control unit 11 proceeds to a process in step S109.

In step S109, the first control unit 11 determines whether the second control unit 12 has been activated. If it determines that the second control unit 12 has been activated (Yes in S109), the first control unit 11 sets RGB 211 as the retrieved source 133 (S116) and then proceeds to step S201 shown in FIG. 3. On the other hand, if it is determined that the second control unit 12 has not yet been activated (No in S109), the first control unit 11 proceeds to a process in step S110.

In step S110, the first control unit 11 determines whether there is an input of an external signal T1 from Video 212. If it determines that there is an input of an external signal T1 from Video 212 (Yes in S110), the first control unit 11 switches the source to the external signal T1 from the Video 212 for projection (S117) and ends the process. If it determines that there is no input of an external signal T1 from Video 212 (No in S110), the first control unit 11 proceeds to a process in step S111.

In step S111, the first control unit 11 determines whether the second control unit 12 has been activated. If it determines that the second control 12 has been activated (Yes in S111), the first control unit 11 set Video 212 as the retrieved source 133 (S118) and then proceeds to step S201 shown in FIG. 3. On the other hand, if it determines that the second control unit 12 has not yet been activated (No in S111), the first control unit 11 proceeds to a process in step S112.

In step S112, the first control unit 11 determines whether the counter 132 stored in the storage unit 13 has completely counted up or down. As a determination method used in step S112, for example, the first control unit 11 can determine whether the counter 132 has completely counted up or down by the first control unit 11 counting up or down values stored in the counter 132 to determine whether a predetermined threshold is reached. If it determines that the counter 132 has completely counted up or down (Yes in S112), the first control unit 11 ends the process, whereas if it determines that the counter 132 has not yet completely counted up or down (No in S112), the first control unit proceeds to a process in step S119.

In step S119, the first control unit 11 updates the value of the counter 132 of the storage unit 13. For example, the first control unit 11 can count the number of times of determination on whether there is an input of an external signal T1 from HDMI 213, RGB 211 and Video 212 by counting up or counting down the value of the counter 132. As a result, the first control unit 11 can end the process when the first control unit 11 determines that the second control unit 12 has not been activated and has performed a predetermined number of times (for example, twice) of determination on whether there is an input of an external signal T1 into the first input unit 21. The flow of processes returns to step S106 after step S119.

The number of times of counting until the counter 132 completely counts up or down can be set in such a manner that a processing time that is repeated in steps S106 to 112, and S119 becomes longer than an activation time that is expected to be spent in activating the second control unit 12. Additionally, a stopping process (a waiting process) of a certain length of time may be introduced between the processes that are repeated in steps S106 to S112, and S119.

Figure 3:
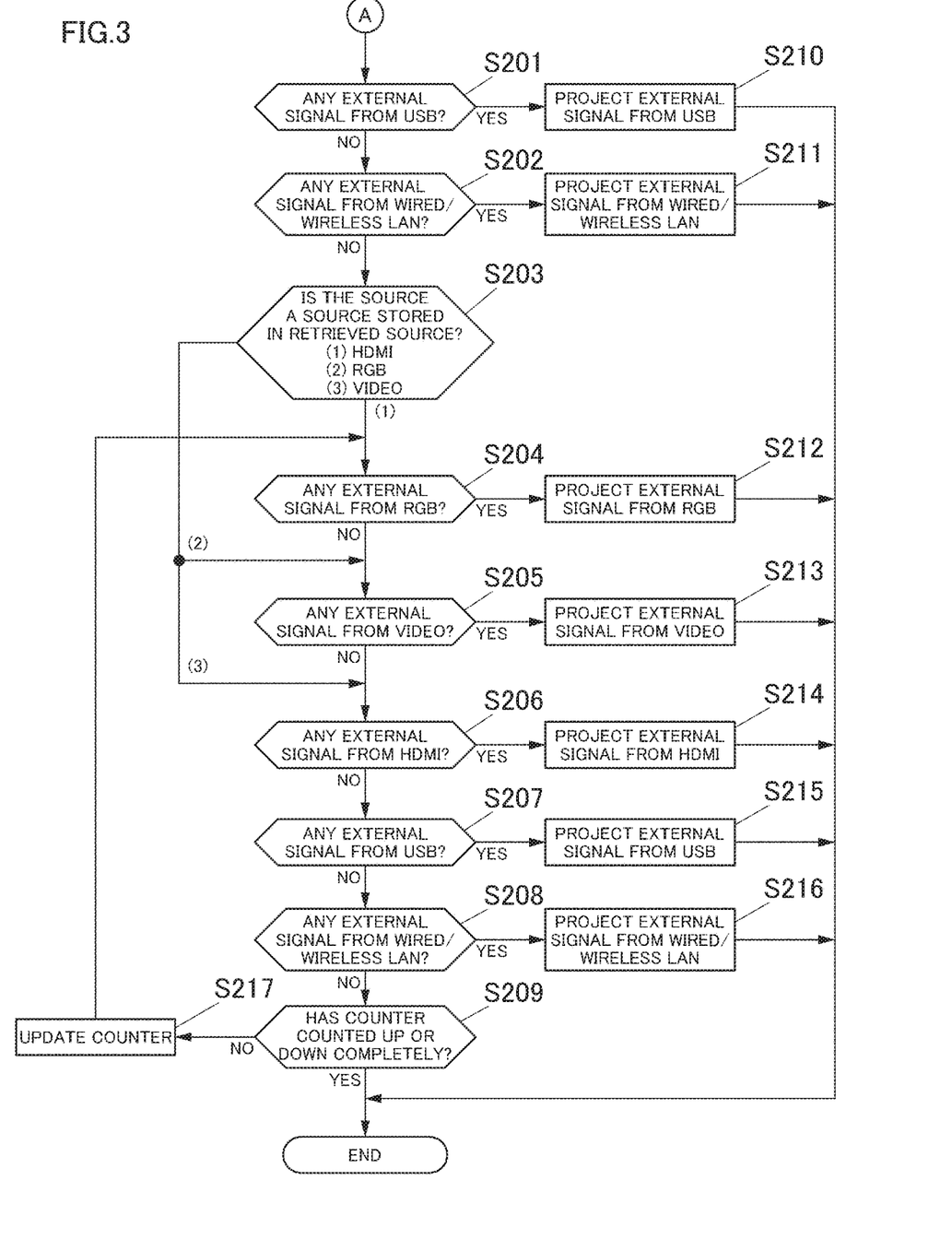
FIG. 3 is a flowchart (2) showing processes to be performed when the projector according to the embodiment of the present invention is activated.

Next, referring to FIG. 3, a flowchart (2) of processes that the first control unit 11 performs when the projector 10 is activated will be described. Firstly, in steps S201, and S202 below, the first control unit 11 determines sequentially whether there is an input of an external signal T2 from the second input unit 22 into the second control unit 12. As to a order in which the determination is made, in the case where the last source 131 obtained in step S103 is any one of RGB 211, Video 212 and HDMI 213 that are included in the first input unit 21, the first control unit 11 determines whether there is an input from the second input unit 22 by following the predetermined determination order in steps S201 and S202. In this embodiment, the order of USB 221 and the wired/wireless LAN 222 is stored in advance in the storage unit 13 as the determination order 134 in the second input unit 22. As a result, with the last source 131 being the first input unit 21, the first control unit 11 determines whether there is an input of an external signal T2 in the order of USB 221 and the wired/wireless LAN 222 as shown in FIG. 3 in each of steps S201 and S202.

On the other hand, in the case where the last source 131 that is obtained in step S103 is either of USB 221 and the wired/wireless LAN 222 that are included in the second input unit 22, the control unit 11 firstly determines whether there is an input of an external signal T2 from the last source 131, and thereafter, the first control unit 11 continues to determine whether there is an input of an external signal T2 by following the determination order 134. For example, in the case where the last zone 131 is the wired/wireless LAN 222, and the determination order 134 in the second input unit 22 is USB 221 and the wired/wireless LAN 222, the first control unit 11 determines whether there is an input of an external signal T2 in the order of the wired/wireless LAN 222 and USB 221 in each of steps S201 and S202. Hereinafter, processes from step S201 on will be described.

In this embodiment, since the last source 131 obtained in step S103 is HDMI 213 of the first input unit 21, the first control unit 11 determines whether there is an input of an external signal T2 in the order of USB 221 and the wired/wireless LAN 222 in each of steps S201 and S202. Hereinafter, the processes according to the flowchart (2) will be described from a process in step S201.

In step S201, the first control unit 11 determines whether there is an input of an external signal T2 from USB 221 of the second input unit 22 by way of the second control unit 12. If it determines that there is an input of an external terminal T2 from USB 221 (Yes in step S201), the first control unit 11 switches the source to the external signal T2 from USB 221 for projection (S210) and ends the process. If it determines that there is no input of an external signal T2 from USB 221 (No in step S201), the first control unit 11 proceeds to a process in step S202.

In step S202, the first control unit 11 determines whether there is an input of an external signal T2 from the wired/wireless LAN 222 of the second input unit 22. If it determines that there is an input of an external signal T2 from the wired/wireless LAN 222 (Yes in S202), the first control unit 11 switches the source to the external signal T2 from the wired/wireless LAN 222 for projection (S211) and ends the process. If it determines that there is no input of an external signal T2 from the wired/wireless LAN 222 (No in S202), the first control unit 11 proceeds to a process in step S203.

In step S203, the first control unit 11 obtains the source of the external input stored in the retrieved source 133 from the storage unit 13. The retrieved source 133 stores any one of RGB 211, Video 212 and HDMI 213 which constitutes the source on which the first control unit has last determined on whether there is an input of an external terminal T1 in the flowchart shown in FIG. 2. If the retrieved source 133 is HDMI 213, the first control unit 11 proceeds to a process in step S204, if the retrieved source 133 is RGB 211, the first control unit 11 proceeds to a process in step S205, and if the retrieved source 133 is Video 212, the first control unit 11 proceeds to a process in step S206. As a result, the determinations made on the individual sources of the first input unit 21 which are interrupted in the determination processes in FIG. 2 can be resumed from where they are interrupted, thereby making it possible to prevent the occurrence of a deviation in the numbers of times of determination provided for the plurality of sources of the first input unit 21.

In step S204, the first control unit 11 determines whether there is an input of an external signal T1 from RGB 211. If it determines that there is an input of an external signal T1 from RGB 211 (Yes in S204), the first control unit 11 switches the source to the external signal T1 from RGB 211 for projection (S212) and ends the process. If it determines that there is no input of an external signal T1 from RGB 211 (No in S204), the first control unit proceeds to a process in step S205.

In step S205, the first control unit 11 determines whether there is an input of an external signal T1 from Video 212. If it determines that there is an input of an external signal T1 from Video 212 (Yes in S205), the first control unit 11 switches the source to the external signal T1 from Video 212 for projection (S213) and ends the process. If it determines that there is no input of an external signal T1 from Video 212 (No in S205), the first control unit 11 proceeds to a process in step S206.

In step S206, the first control unit 11 determines whether there is an input of an external signal T1 from HDMI 213. If it determines that there is an input of an external signal T1 from HDMI 213 (Yes in S206), the first control unit 11 switches the source to the external signal T1 from HDMI 213 for projection (S214) and ends the process. If it determines that there is no input of an external signal T1 from HDMI 213 (No in S206), the first control unit 11 proceeds to a process in step S207.

Once the first control unit 11 ends the determinations on the inputs of the external signals T1 from the first input unit 21, the first control unit 11 determines whether there is an input of an external signal T2 from USB 221 via the second control unit 12 in step S207. If it determines that there is an input of an external signal T2 from USB 221 (Yes in S207), the first control unit 11 switches the source to the external signal 12 from USB 221 for projection (S215) and ends the process. If it determines that there is no input of an external signal T2 from USB 221 (No in S207), the first control unit 11 proceeds to a process in step S208.

In step S208, the first control unit 11 determines whether there is an input of an external signal T2 from the wired/wireless LAN 222 by way of the second control unit 12. If it determines that there is an input of an external signal T2 from the wired/wireless LAN 222 (Yes in S208), the first control unit 11 switches the source to the external signal T2 from the wired/wireless LAN 222 for projection (S216) and ends the process. If it determines that there is no input of an external signal 12 from the wired/wireless LAN 222 (No in S208), the first control unit 11 proceeds to a process in step S209.

In step S209, the first control unit 11 determines whether the counter 132 stored in the storage unit 13 has completely counted up or down. If it determines that the counter 132 has completely counted up or down (Yes in S209), the first control unit 11 ends the process, whereas if it determines that the counter 132 has not yet completely counted up or down (No in S209), the first control unit 11 proceeds to a process in step S217. If it determines whether there are inputs of external signals T1, T2 from the first input unit 21 and the second input unit 22 the predetermined numbers of times of determination, the first control unit 11 can end the processes.

In step S217, the first control unit 11 updates the value of the counter 132 of the storage unit 13 and returns to the process in step S204.

If it determines that there is no input of external signals T1, T2 from any one of the sources, the first control unit 11 determines that the counter 132 has completely counted up or down (Yes in S209) and ends the processes. Then, the first control unit 11 causes a black image or a blue image to be projected from the projector 10 as a projected image or puts the projector 10 in the waiting state where part of the functions of the projector 10 can be stopped for rest.

Figure 2:
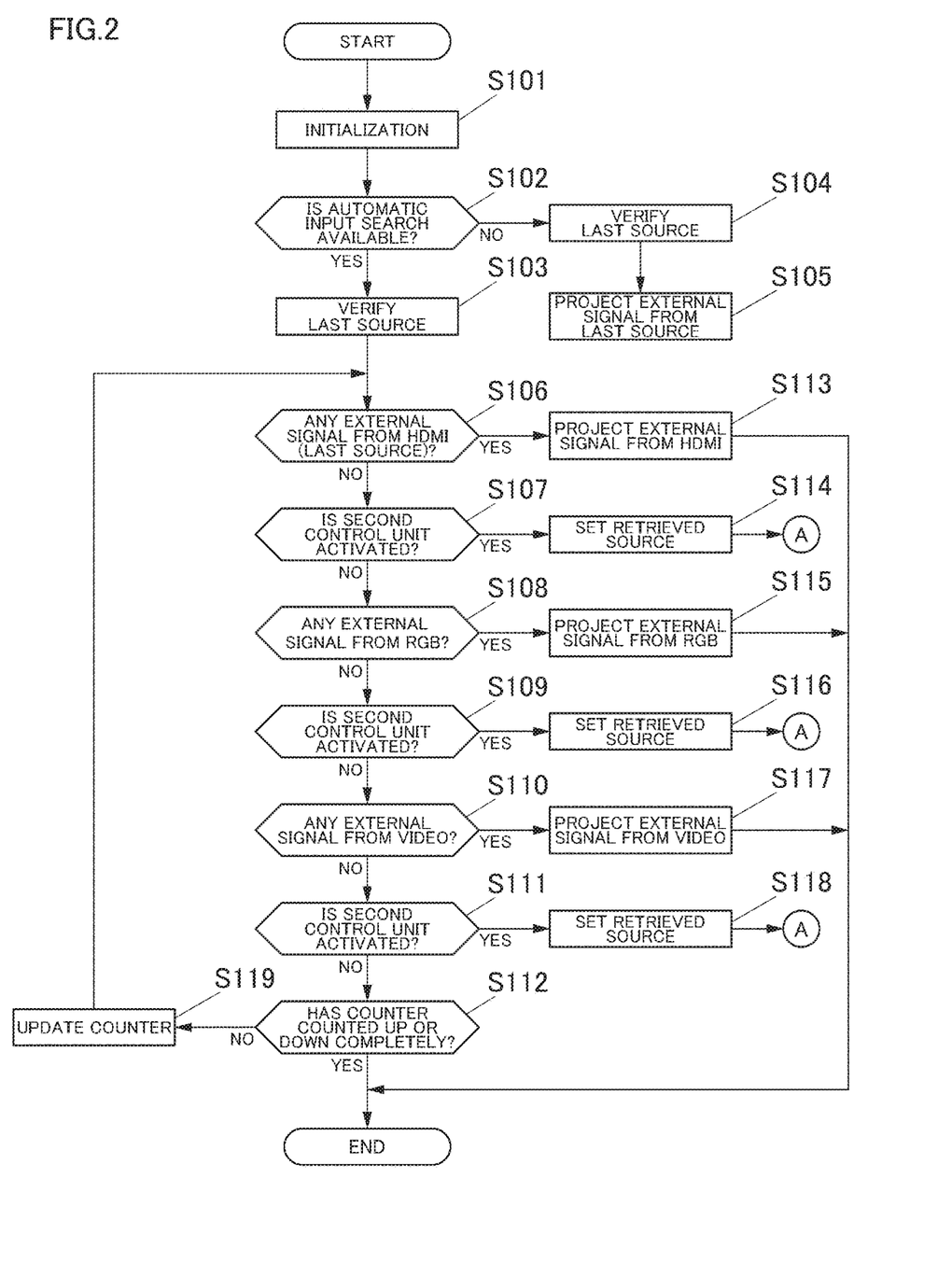
FIG. 2 is a flowchart (1) showing processes to be performed when the projector according to the embodiment of the present invention is activated.

Thus, as has been described heretofore, in the embodiment, in the flowchart shown in FIG. 2, if the first control unit 11 detects the activation of the second control unit 12 (S107, S109, S111), the first control unit 11 is described as performing the process of determining whether there is an input of an external signal T2, but the present invention is not limited to this configuration. For example, the following configuration may be adopted. That is, if the first control unit 11 detects the activation of the second control unit 12, the first control unit 11 proceeds to the process in step S201 after the first control unit 11 determines whether there is an input of an external signal T1 on all the sources (in the example shown in FIG. 1, RGB 211, Video 212, and HDMI 213) of the first input unit 21. In this case, a setting process (steps S114, S116, and S118 in FIG. 2) and a branching process (step S203 in FIG. 3) of the retrieved source 133 can be omitted.

In addition, the projector 10 can be switched to a sleep mode when the projector 10 is not operated for a certain period of time or manually by a user. In the sleep mode, the first control unit 11 is left in the rest mode, and the second control unit 12 is left in the waiting state where the second control unit 12 can receive an external signal T2 from the second input unit 22. As this occurs, when it receives an external signal T2 from the second input unit 22, the second control unit 12 activates the first control unit 11. Thereafter, when the first control unit 11 starts the processes from step S101 on by following the flowchart shown in FIG. 2, since the second control unit 12 is already activated (Yes in step S107), the second control unit 12 receives an external signal T2 from the second input unit 22 and can project image light based on the external signal T2 so received.

Additionally, in the embodiment, the projector 10 is described as functioning as the device configured to detect the signals, but the present invention is not limited to this configuration. The signal detection method disclosed in this embodiment can be applied to other devices or computers, provided that the devices or computers include a signal detection device including the first control unit and the second control unit, causing the computers or devices to execute the signal detection program for detection of the signals. For example, the signal detection device can be applied to a personal computer including a plurality of external signal input units, a television, a smartphone or an external monitor, or a relay device for receiving an external signal for transmission to another device. The external signal inputted into the signal detection device can be outputted to a storage unit, a control unit and a communication unit, and other functional units that are provided in an interior of the signal detection device or in an external device.

Additionally, the color wheel 112 may be omitted as required depending upon the configuration of the projector 10. Light from the light source 111 can be shined on to the display device 113 byway of a light guiding optical system, not shown.

The first control unit 11 describes as activating the second control unit 12, but the present invention is not limited to this configuration. In the case where the activating time of the second control unit 12 is known, the activation of the second control unit 12 does not have to be detected directly. That is, a longer time than the activating time of the second control unit 12 is set, and the second control unit 12 may be activated when the set longer time has elapsed.

Thus, the projector 10 of this embodiment includes the first control unit 11 configured to determine whether there are inputs of a plurality of external signals connected thereto, the second control unit 12 configured to be activated after the first control unit is activated, the first input unit 21 connected directly to the first control unit 11 and configured to input a first external signal, which is one type of the plurality of external signals, and the second input unit 22 connected to the first control unit 11 via the second control unit 12 and configured to input a second external signal, which is another type of the plurality of external signals. Then, the first control unit 11 determines whether there is an input of the first external signal after the first control unit 11 is activated and determines whether there is an input of the second external signal after the second control unit 12 is activated.

For example, the multimedia CPU that is described as the second control unit 12 may take a longer time to be activated than the first control unit 11, which functions as the main CPU from time to time. As a result, with the configuration described above adopted, since the first control unit 11 does not perform a determination on whether there is an input from the second input unit 22 that is connected with the second control unit 12 before the second control unit 12 is activated, a wasteful process can be reduced, and the first control unit 11 can be switched to perform the process of detecting an input of an external signal from the second input unit 22 after the second control unit 12 is activated. Thus, an external signal from the first input unit 21 or the second input unit 22 can be detected with good efficiency.

With the signal detection device in which the first control unit 11 is configured to detect further whether there is an input of a first external signal after the first control unit 11 has detected whether there is an input of a second external signal that is inputted into the second control unit 12, an external signal T1 or T2 that is inputted from the first input unit 21 or the second input unit 22 can be outputted quickly.

In addition, as shown in FIGS. 2 and 3, with the signal detection device in which the second control unit 12 is caused to determine whether all the second external signals are inputted before whether all the first external signals are inputted is determined when the first control unit 11 detected the activation of the second control unit 12 to thereby enable the detection on whether there is an input of a first external signal to be resumed in the midst of the process, not only can external signals T2 from the second input unit 22 be included in the detection targets, but also whether there is an input of an external signal T2 from the second input unit 22 can be determined for preference.

With the signal detection device, the process of determining whether there is an input of a first external signal is ended even before the activation of the second control unit 12 when whether there is an input of a first external signal is determined the predetermined number of times of determination, as a result of which the consumed power can be reduced based on the determination that the external connection devices are not connected.

With the signal detection device in which the determination process is ended when whether there are inputs of first external signals and second external signals is determined the predetermined numbers of times of determination after the second control unit 12 is activated, the consumed power can be reduced based on the determination that the external connection devices are not connected.

With the signal detection device in which the second control unit 12 is caused to determined whether there is an input of a second external signal after whether there are inputs of all the first external signals is determined when the activation of the second control unit 12 is detected, the process can be simplified, thereby making it possible to reduce the load associated with the controlling.

The projector 10 includes the last source 131 that stores the first input unit 21 or the second input unit 22 and the determination order 134 including the determination orders for the first external signals and the second external signals. In the case where the last source 131 is the second input unit 22, whether there is an input of a first external signal is determined by following the determination order 134, and after the second control unit 12 is activated, whether there is an input of a second external signal is determined sequentially from the last source 131 after the second control unit 12 is activated. Then, in the case where the last source 131 is the first input unit 21, whether there is an input of a first external signal is determined from the last source 131. As a result, the first control unit 11 can make a quick detection of an external signal from an input system that is used most recently or last.

With the signal detection device in which when detecting a first external signal or a second external signal, the first control unit 11 ends the process by outputting the detected first external signal or second external signal to other functional portions, the external signals T1, T2 that are initially detected can be made use of quickly.

With the signal detection device constituting the projector 10 including the light source 111 and the display device 113 and configured to project the first external signal or the second external signal, the projector 10 can be provided which can detect the external signals with good efficiency to thereby output them as projected light.

The embodiment is presented as an example, and hence, there is no intention to limit the scope of the present invention by the embodiment. The novel embodiment can be carried out in other various forms, and various omissions, replacements and modifications can be made thereto without departing from the spirit and scope of the present invention. Those resulting embodiments and their modifications are included in the spirit and scope of the present invention and are also included in the scope of inventions claimed for patent under claims below and their equivalents.

What is claimed is:

1. A signal detection device comprising:
   a first control unit configured to determine whether there are inputs of a plurality of external signals connected thereto;
   a second control unit configured to be activated after the first control unit is activated;
   a first input unit connected directly to the first control unit and configured to input a first external signal, which is one type of the plurality of external signals; and
   a second input unit connected to the first control unit via the second control unit and configured to input a second external signal, which is another type of the plurality of external signals,
   wherein the first control unit determines whether there is an input of the first external signal before the second control unit is activated and determines whether there is an input of the second external signal after the second control unit is activated.

2. The signal detection device according to claim 1, wherein the first control unit does not determine whether there is an input of the second external signal before the second control unit is activated.

3. The signal detection device according to claim 1, wherein the first control unit further determines whether there is an input of the first external signal after the first control unit has determined whether there is an input of the second external signal.

4. The signal detection device according to claim 2, wherein the first control unit further determines whether there is an input of the first external signal after the first control unit has determined whether there is an input of the second external signal.

5. The signal detection device according to claim 3, wherein with the first external signal made up of a plurality of first external signals and the second external signal made up of a plurality of second external signals, the first control unit determines whether there are inputs of all the second external signals after the second control unit is activated and before the first control unit determines whether there are inputs of all the first external signals and resumes the determination on whether there is an input of the first external signal in the midst of the process.

6. The signal detection device according to claim 4, wherein with the first external signal made up of a plurality of first external signals and the second external signal made up of a plurality of second external signals, the first control unit determines whether there are inputs of all the second external signals after the second control unit is activated and before the first control unit determines whether there are inputs of all the first external signals and resumes the determination on whether there is an input of the first external signal in the midst of the process.

7. The signal detection device according to claim 1, wherein the first control unit determines whether there is an input of the first external signal a predetermined number of times of determination and then ends the process even before the second control unit is activated.

8. The signal detection device according to claim 2, wherein the first control unit determines whether there is an input of the first external signal a predetermined number of times of determination and then ends the process even before the second control unit is activated.

9. The signal control device according to claim 1, wherein after the second control unit is activated, the first control unit determines whether there is an input of the first external signal and whether there is an input of the second external signal predetermined numbers of determination and then ends the processes.

10. The signal control device according to claim 2, wherein after the second control unit is activated, the first control unit determines whether there is an input of the first external signal and whether there is an input of the second external signal predetermined numbers of determination and then ends the processes.

11. The signal detection device according to claim 1, wherein with the first external signal made up of a plurality of first external signals, after the second control unit is activated, the first control unit determines whether there is an input of the second external signal after the first control unit determines whether there are inputs of all the first external signals.

12. The signal detection device according to claim 2, wherein with the first external signal made up of a plurality of first external signals, after the second control unit is activated, the first control unit determines whether there is an input of the second external signal after the first control unit determines whether there are inputs of all the first external signals.

13. The signal detection device according to claim 3, wherein with the first external signal made up of a plurality of first external signals, after the second control unit is activated, the first control unit determines whether there is an input of the second external signal after the first control unit determines whether there are inputs of all the first external signals.

14. The signal detection device according to claim 1, comprising:
   a storage unit storing in advance a last source storing the first input unit or the second input unit, and a determination order for each of the first external signal and the second external, wherein with the last source being the second input unit, the first control unit determines whether there is an input of the first external signal by following the determination order, and determines whether there is an input of the second external signal sequentially from the last source after the second control unit is activated, and wherein with the last source being the first input unit, the first control unit determines whether there is an input of the first external signal from the last source.

15. The signal detection device according to claim 2, comprising:

a storage unit storing in advance a last source storing the first input unit or the second input unit, and a determination order for each of the first external signal and the second external, wherein with the last source being the second input unit, the first control unit determines whether there is an input of the first external signal by following the determination order, and determines whether there is an input of the second external signal sequentially from the last source after the second control unit is activated, and wherein with the last source being the first input unit, the first control unit determines whether there is an input of the first external signal from the last source.

16. The signal detection device according to claim 1, wherein when detecting the first external signal or the second external signal, the first control unit outputs the first external signal or the second external signal so detected to another functional unit and ends the process.

17. The signal detection device according to claim 2, wherein when detecting the first external signal or the second external signal, the first control unit outputs the first external signal or the second external signal so detected to another functional unit and ends the process.

18. The signal detection device according to claim 1, wherein the signal detection device constitutes a projector comprising a light source, and a display device configured to form image light from light emitted from the light source based on image data contained in the first external signal or the second external signal and project the image light formed to an exterior of the projector.

19. A signal detection method for a device comprising:

a first control unit configured to determine whether there are inputs of a plurality of external signals connected thereto, a second control unit configured to be activated after the first control unit is activated, a first input unit connected directly to the first control unit and configured to input a first external signal, which is one type of the plurality of external signals, and a second input unit connected to the first control unit via the second control unit and configured to input a second external signal, which is another type of the plurality of external signals, wherein the first control unit determines whether there is an input of the first external signal after the first control unit is activated and determines whether there is an input of the second external signal after the second control unit is activated.

20. A storage medium configured to be read by a computer incorporating an apparatus comprising:

the apparatus comprising:

a first control unit configured to determine whether there are inputs of a plurality of external signals connected thereto, a second control unit configured to be activated after the first control unit is activated, a first input unit connected directly to the first control unit and configured to input a first external signal, which is one type of the plurality of external signals, and a second input unit connected to the first control unit via the second control unit and configured to input a second external signal, which is another type of the plurality of external signals, wherein the computer is caused to determine whether there is an input of the first external signal after the first control unit is activated and determine whether there is an input of the second external signal after the second control unit is activated.

* * * * *

UNITED STATES PATENT AND TRADEMARK OFFICE
CERTIFICATE OF CORRECTION

PATENT NO. : 11,431,946 B2
APPLICATION NO. : 16/715125
DATED : August 30, 2022
INVENTOR(S) : Toshiharu Arai It is certified that error appears in the above-identified patent and that said Letters Patent is hereby corrected as shown below:

In the Claims

Claim 9, Column 12, Line 29, delete "signal control device" and insert -- signal detection device --.
Claim 10, Column 12, Line 35, delete "signal control device" and insert -- signal detection device --.

Signed and Sealed this
Fourteenth Day of March, 2023

Katherine Kelly Vidal
*Director of the United States Patent and Trademark Office*